United States Patent
Yasunami

(12) 
(10) Patent No.: US 6,371,995 B1
(45) Date of Patent: Apr. 16, 2002

(54) NONAQUEOUS SECONDARY BATTERY AND METHOD FOR PREPARING SAME

(75) Inventor: Shoichiro Yasunami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/125,146
(22) PCT Filed: Feb. 14, 1997
(86) PCT No.: PCT/JP97/00406
§ 371 Date: Aug. 11, 1999
§ 102(e) Date: Aug. 11, 1999
(87) PCT Pub. No.: WO97/30487
PCT Pub. Date: Aug. 21, 1997

(30) Foreign Application Priority Data

Feb. 16, 1996 (JP) .............................. 8-028978

(51) Int. Cl.$^7$ .............................................. H01M 10/38
(52) U.S. Cl. .................. 29/623.1; 429/94; 429/324; 429/218.1; 429/231.1
(58) Field of Search ................... 29/623.1; 429/94, 429/324, 218.1, 231.1

(56) References Cited

U.S. PATENT DOCUMENTS

| | | | | |
|---|---|---|---|---|
| 5,443,925 A | * | 8/1995 | Machida et al. | 429/94 |
| 5,632,784 A | * | 5/1997 | Yoon | 29/623.1 |
| 5,871,865 A | * | 2/1999 | Barker et al. | 29/623.1 X |

* cited by examiner

Primary Examiner—John S. Maples
(74) Attorney, Agent, or Firm—Sughrue Mion, PLLC

(57) ABSTRACT

A nonaqueous secondary battery comprising a positive electrode sheet having a layer mainly comprising a lithium-containing metal oxide, a negative electrode sheet having a negative electrode material mixture layer mainly comprising a negative electrode material laminated with a metallic material mainly comprising lithium, a nonaqueous electrolytic solution containing a lithium salt, and a separator, wherein the nonaqueous secondary battery is prepared by a process which comprises winding the positive electrode sheet, negative electrode sheet and separator; inserting the elements thus wound into a battery can; injecting said electrolytic solution into the battery can, sealing the battery can, and then ageing the battery, whereby lithium is previously intercalated in the negative electrode sheet to provide a nonaqueous secondary battery having a high discharge capacity and good charge-discharge cycle characteristics.

13 Claims, 1 Drawing Sheet

NONAQUEOUS SECONDARY BATTERY AND METHOD FOR PREPARING SAME

TECHNICAL FIELD

The present invention relates to a nonaqueous secondary battery having improved charge-discharge capacity and cycle characteristics.

PRIOR ART

Representative examples of negative electrode material for nonaqueous secondary battery include lithium metal and lithium alloy. However, the use of such a negative electrode material involves a risk of internal shortcircuiting caused by the production of so-called dendrite, i.e., branched lithium crystal during charging/discharging or ignition attributed to the high activity of dendrite itself.

On the other hand, a calcined carbonaceous material capable of reversibly intercalating/deintercalating lithium has been recently put into practical use. Such a carbonaceous material has disadvantage that it has a relatively low density and therefore a low capacity per unit volume. Pressing or lamination of a carbonaceous material with a lithium foil is disclosed in JP-A-5-151995 (The term "JP-A" as used herein means an "unexamined published Japanese patent application"). However, this approach cannot give an essential solution to the foregoing problems due to the foregoing disadvantage.

Further, the use of an oxide of Sn, V, Si, B, Zr or the like or a composite oxide thereof has been proposed (JP-A-5-174818, JP-A-6-60867, JP-A-6-275267, JP-A-6-325765, JP-A-6-338324, EP-615296). It is said that the combination of a negative electrode comprising such an oxide or composite oxide with a positive electrode comprising a certain kind of a transition metal compound containing lithium can give a 3–3.6 V class nonaqueous secondary battery having a great charge capacity which shows little or no production of dendrite in practical use to give an extremely high safety. However, batteries comprising these materials have greatly disadvantage in that they exhibit insufficient charge-discharge cycle characteristics, particularly a low charge-discharge efficiency in the initial cycle. In other words, it can be presumed that a part of lithium which has been intercalated in the negative electrode during the charging process undergoes a plurality of irreversible side-reactions that prevent lithium from migrating toward the positive electrode during the discharging process, resulting in idle consumption of lithium in the positive electrode that causes capacity loss. In order to make up for the capacity loss, it has been proposed that lithium be previously intercalated in the negative electrode material in an amount corresponding to the loss. However, satisfactory effects have never been obtained yet.

Therefore, an object of the present invention is to provide a nonaqueous secondary battery having (1) high charge-discharge capacity and good charge-discharge cycle characteristics and (2) a high energy density.

DISCLOSURE OF THE INVENTION

The foregoing object of the present invention is accomplished with nonaqueous secondary batteries according to the following items.

(1) A nonaqueous secondary battery comprising a positive electrode sheet having a layer mainly comprising a lithium-containing metal oxide, a negative electrode sheet having a negative electrode material mixture layer mainly comprising a negative electrode material laminated with a metallic material mainly comprising lithium, a nonaqueous electrolytic solution containing a lithium salt, and a separator, wherein the nonaqueous secondary battery is prepared by a process which comprises winding the positive electrode sheet, negative electrode sheet and separator; inserting the elements thus wound into a battery can; injecting the electrolytic solution into the battery can, sealing the battery can, ageing the battery at a low temperature, charging or discharging the battery, and then ageing the battery at a high temperature.

(2) The nonaqueous secondary battery as in the above item (1), wherein the negative electrode sheet is one comprising a layer mainly comprising an oxide or chalogenide of a metallic or semi-metallic element and at least one auxiliary layer containing an electrically-conductive water-insoluble particle laminated with a metallic material mainly comprising lithium.

(3) The nonaqueous secondary battery as in the above item (2), wherein the temperature at which the low temperature ageing is effected is from 2° C. to 30° C.

(4) The nonaqueous secondary battery as in the above item (1) or (2), wherein the charging or discharging before the high temperature ageing causes the open-circuit voltage of the battery to be from 2.5 V to 3.8 V.

(5) The nonaqueous secondary battery as in the above item (4), wherein the charging or discharging before the high temperature ageing is effected within 60 days after sealing.

(6) The nonaqueous secondary battery as in the above item (5), wherein the temperature at which the high temperature ageing is effected is from 40° C. to 70° C.

(7) The nonaqueous secondary battery as in the above item (6), wherein the duration of the high temperature ageing is from 1 hour to 40 days.

(8) The nonaqueous secondary battery as in the above item (5), wherein the charging process is a constant electrical quantity charging process and the electrical quantity used is from 40 mAH to 400 mAH.

(9) The nonaqueous secondary battery as in any one of the above items (5) to (8), wherein the charge-discharge process involves a constant voltage charging process which terminates at a voltage of from 2.0 to 3.8 V and a constant current discharging process which terminates at a voltage of from 1.0 to 3.5 V and the number of charge-discharge cycles is from 1 to 500.

(10) The nonaqueous secondary battery as in any one of the above items (1) to (9), wherein the negative electrode is made of a composite oxide or chalcogenide containing tin.

(11) The nonaqueous secondary battery as in the above item (10), wherein the composite oxide or chalcogenide containing tin is a compound represented by formula (1):

$$SnM^1_a O_t S_u \qquad (1)$$

wherein $M^1$ represents two or more elements selected from the group consisting of Al, B, P, Si, Ge, elements belonging to the groups I to III in the periodic table, and halogen elements; a represents a number of from 0.2 to 2; t represents a number of from 1 to 6; and u represents a number of not more than 0.5.

(12) The nonaqueous secondary battery as in the above item (11), wherein the composite oxide or chalcogenide containing tin is a compound represented by formula (3):

$$SnM^3_c M^4_d O_t S_u \qquad (3)$$

wherein $M^3$ represents at least one element selected from the group consisting of Al, B, P, Si and Ge; $M^4$ represents at least one element selected from the group consisting of elements belonging to the groups I to III in the periodic table, and halogen elements; c represents a number of from 0.2 to 2; d represents a number of from 0.01 to 1; t represents a number of from 1 to 6; and u represents a number of not more than 0.5, with the proviso that c and d satisfy the relationship of 0.2<c+d<2.

BEST EMBODIMENTS OF THE INVENTION

Figure 1:
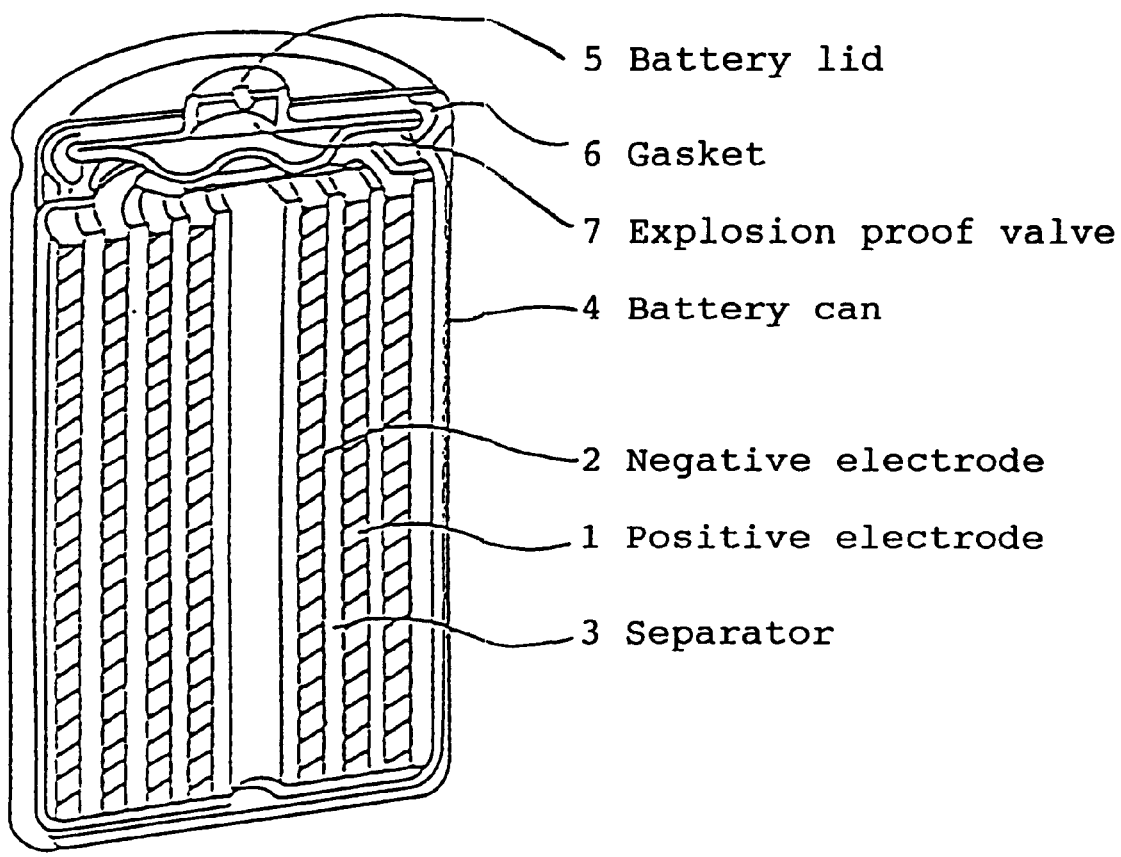
FIG. 1 is a vertical sectional view of an ordinary cylindrical battery according to the present invention. The reference numerals in the drawing will be described below. 1 . . . Positive electrode, 2 . . . Negative electrode, 3 . . . Separator, 4 . . . Battery can, 5 . . . Battery lid, 6 . . . Gasket, 7 . . . Explosion-proof valve

The inventors made extensive studies of method for previously intercalating lithium in a negative electrode material. As a result, it was found that the open-circuit voltage of the battery during ageing after the injection of the electrolytic solution and cramping (also referred to as "sealing") extremely influence the uniform intercalation of lithium and hence the battery capacity or cycle characteristics. The process according to the present invention involves low temperature ageing while being not charged after the injection of the electrolytic solution and sealing, followed by charging or charging/discharging to be subjected to high temperature ageing.

The term "ageing" as used herein means that the battery is stored in a predetermined environment (e.g., environmental temperature) for a predetermined period of time to stabilize its properties.

The low temperature ageing preferably involves steps of checking the open-circuit voltage, cleaning the battery, drying the battery, etc. The open-circuit voltage of the battery during low temperature ageing is preferably from 0.5 to 3.0 V, particularly from 1.0 to 2.5 V. The open-circuit voltage of the battery during low temperature ageing is defined by the amount of lithium laminated on the auxiliary layer in the negative electrode of the present invention (described later). The duration of low temperature ageing is preferably within 60 days, particularly within 10 days, from immediately after sealing. The temperature at which the low temperature ageing is effected is preferably from 2° C. to 30° C., particularly from 5° C. to 25° C. During ageing, including high temperature ageing described later, the battery may be positioned vertically or horizontally. Alternatively, the battery may be continuously rotated or otherwise moved.

The low temperature ageing may involve steps of checking, cleaning and drying the battery. The checking step and other steps are preferably effected before low temperature ageing. Thus, the process of the present invention may involve sealing, checking, cleaning, drying, and low temperature ageing in this order.

In the present invention, the low temperature ageing is followed by charging or charging/discharging.

If the open-circuit voltage of the battery is adjusted by charging, a constant electrical quantity charging process is preferably effected, and the electrical quantity used in this process is preferably from 40 mAH to 400 mAH, particularly from 60 mAH to 200 mAH. The duration of charging is preferably from 0.2 to 20 hours, more preferably from 0.5 to 10 hours, particularly from 0.5 to 5 hours.

If the open-circuit voltage of the battery is adjusted by charging/discharging, a combination of constant voltage charging and constant current charging is preferably effected. The charge-terminal voltage of the constant voltage charging process is preferably from 2.5 to 3.8 V, particularly preferably from 2.7 to 3.5 V. The discharge-terminal voltage of the constant current discharging process is preferably from 2.5 to 3.8 V, particularly preferably from 2.7 to 3.5 V. The current density at which the charging or discharging process is effected is preferably from 0.05 to 4.5 mA, more preferably from 0.1 to 3.0 mA, particularly preferably from 0.15 to 2.4 mA, per $cm^2$ of the negative electrode sheet on one side thereof. The duration of charging is preferably from 0.2 to 20 hours, more preferably from 0.5 to 10 hours, particularly preferably from 0.5 to 5 hours. The number of charge-discharge cycles is preferably from 1 to 500, more preferably from 5 to 200, particularly preferably from 10 to 150. If the open-circuit voltage of the battery is adjusted by charging/discharging, the process may end with charging or discharging.

The temperature at which the foregoing charging or charging/discharging process is effected is preferably from 0° C. to 60° C., more preferably from 10° C. to 50° C., particularly preferably from 20° C. to 40° C. This charging or charging/discharging process may be effected any times during ageing. In practice, however, it is preferably effected once, twice or three times, particularly preferably once.

The temperature at which the high temperature ageing is effected is preferably from 40° C. to 70° C., particularly preferably from 45° C. to 65° C. The duration of high temperature ageing is preferably from 1 hour to 40 days, particularly preferably from 3 hours to 25 days.

As the metal mainly comprising lithium there is preferably used lithium metal, more preferably lithium metal having a purity of not less than 90% by weight, particularly preferably lithium metal having a purity of not less than 98% by weight. Referring to the lamination pattern of lithium on the negative electrode sheet, it is preferred that lithium be laminated on the entire surface of the negative electrode sheet. However, since lithium which has previously been intercalated in the negative electrode material is gradually diffused in the negative electrode material by ageing, it is also preferred that lithium be partially laminated on the negative electrode sheet in a striped, frame-shaped or disc-shaped pattern. The term "lamination" as used herein means pressing of a metal foil mainly comprising lithium directly on a sheet comprising a negative electrode material mixture layer and an auxiliary layer.

The intercalated amount of lithium can be arbitrarily controlled by the amount of lithium laminated on the negative electrode sheet. The pre-intercalated amount of lithium is preferably from 0.5 to 4.0 equivalents, more preferably from 1 to 3.5 equivalents, particularly from 1.2 to 3.2 equivalents, to the negative electrode material. If the pre-intercalated amount of lithium falls less than 0.5 equivalents per the negative electrode material, the resulting battery capacity is low. On the contrary, if the pre-intercalated amount of lithium exceeds 4.0 equivalents per the negative electrode material, the cycle characteristics can be deteriorated.

The covering percent of the metal foil laminated to the negative electrode sheet is preferably from 10% to 100%, more preferably from 15% to 100%, particularly preferably from 20% to 100%. If the covering percent of the metal foil laminated to the negative electrode sheet falls less than 20%, the pre-intercalation of lithium can be ununiform, which is not preferred. From the standpoint of uniformity, the thickness of the metal foil mainly comprising lithium is preferably from 5 to 150 μm, more preferably from 5 to 100 μm, particularly preferably from 10 to 75 μm.

The atmosphere in which the metal foil mainly comprising lithium is subjected to handling such as cutting and sticking is preferably dried air or argon gas having a dew point of from –80° C. to –30° C., more preferably from –80° C. to –40° C. if dried air is used. The foregoing atmosphere, particularly argon gas atmosphere, if any, is preferably used in combination with carbon dioxide gas.

The auxiliary layer and protective layer to be provided on the surface of the electrode will be described hereinafter.

In the present invention, the auxiliary layer provided on the negative electrode sheet consists of at least one layer and may be composed of a plurality of the same or different layers. These auxiliary layers are each made of an electrically-conductive water-insoluble particle and a binder. As such a binder there may be used one which is used to prepare an electrode material mixture described later. The content of the electrically-conductive particle in the auxiliary layer is preferably from 2.5% to 96% by weight, more preferably 5% to 95% by weight, particularly preferably 10% to 93% by weight.

Examples of the electrically-conductive water-insoluble particle which can be used in the present invention include metal, metal oxide, metal fiber, carbon fiber, and carbon powder such as carbon black and graphite. The water-solubility of the electrically-conductive water-insoluble particle is not more than 100 ppm, preferably none. Preferred among these electrically-conductive water-insoluble particles are those having a low reactivity with preferably alkaline metal, particularly with lithium. Particularly preferred among these electrically-conductive water-insoluble particles are metal powder and carbon powder. The electrical resistivity of the element constituting the electrically-conductive water-insoluble particle at 20° C. is preferably not higher than $5 \times 10^9$ Ω·m.

As the metal to be used in powdered form there is preferably used a metal having a low reactivity with lithium, i.e., metal which can difficultly form a lithium alloy. Preferred examples of such a metal include copper, nickel, iron, chromium, molybdenum, titanium, tungsten, and tantalum. The metal powder may be in any form such as acicular, column, tablet and mass. The maximum diameter of the metal powder is preferably from 0.02 μm to 20 μm, more preferably than 0.1 μm to 10 μm. The surface of the metal powder to be used is preferably not too be oxidized. If oxidized, it is preferably subjected to heat treatment in a reducing atmosphere.

As the carbon powder there may be used a well-known carbonaceous material which has heretofore been used as an electrically-conductive material to be used with an electrode active material which is not electrically-conductive. Examples of the carbonaceous material employable herein include carbon black such as thermal black, furnace black, channel black and lamp black; natural graphite such as flake graphite, scaly graphite and earthy graphite; artificial graphite, and carbon fiber. In order to mix such a carbon powder and a binder in dispersion, it is preferred that carbon black and graphite be used in combination. Preferred examples of carbon black include acetylene black and Ketjen black. The particle size of the carbon powder is preferably from 0.01 μm to 20 μm, more preferably 0.02 μm to 10 μm.

The foregoing auxiliary layer may comprise a particle having substantially no electrical conductivity incorporated therein for the purpose of enhancing the strength of the coating layer. Examples of the particle employable herein include teflon fine powder, SiC, aluminum nitride, alumina, zirconia, magnesia, mullite, forsterite, and stearite. Such the particle is preferably used in an amount of from 0.01 times to 10 times that of the electrically-conductive particle.

The auxiliary layer may be provided on either or both sides of the negative electrode if the negative electrode is formed by applying a negative electrode material mixture to the both sides of a current collector.

The application of the auxiliary layer to the negative electrode can be accomplished by a successive coating method which comprises applying an electrode material mixture mainly comprising a metal or semi-metal oxide or chalcogenide as a material capable of reversibly intercalating/deintercalating lithium to a current collector, and then applying an auxiliary layer to the negative electrode material mixture layer or a simultaneous coating method which comprises the simultaneous application of an electrode material mixture layer and an auxiliary layer.

The positive electrode sheet to be combined with the negative electrode sheet may comprise such a protective layer. In this case, the auxiliary layer consists of at least one layer and may be composed of a plurality of the same or different layers. These auxiliary layers may have substantially no electronic conductivity, i.e., may be insulating or may be electrically conductive similarly to the negative electrode sheet. Alternatively, the auxiliary layer may be a laminate of an insulating layer and an electrically-conductive layer. The thickness of the protective layer is preferably from 1 μm to 40 μm, more preferably 2 μm to 30 μm. The protective layer comprising such the particle preferably doesn't melt or form a new film at temperatures of not higher than 300° C.

When the protective layer is made of an electrically-conductive water-insoluble particle and a binder, the electrically-conductive particle employable herein may be the same as used in the auxiliary layer in the negative electrode sheet. The kind and size of the electrically-conductive particle which can be preferably used herein are the same as used in the negative electrode sheet.

The protective layer, if it is insulating, preferably comprises an organic or inorganic particle. The size of the organic or inorganic particle is preferably from 0.1 μm to 20 μm, more preferably 0.2 μm to 15 μm. A preferred example of the organic particle is a powdered crosslinked latex or fluororesin which preferably doesn't decompose or form a film. An even better example of the organic particle is a teflon fine powder.

Examples of the inorganic material employable herein include metal, and carbide, silicide, nitride, sulfide and oxide, of non-metallic element.

Among carbide, silicide and nitride, SiC, aluminum nitride (AlN), BN, and BP are desirable because they have high insulating property and chemical stability. In particular, SiC obtained by using BeO, Be or BN as a sintering aid is preferred.

Preferred among chalcogenides is oxide. Preferably, the oxide can be difficultly oxidized and reduced. Examples of the oxide include $Al_2O_3$, $As_4O_6$, $B_2O_3$, $BaO$, $BeO$, $CaO$, $Li_2O$, $K_2O$, $Na_2O$, $In_2O_3$, $MgO$, $Sb_2O_5$, $SiO_2$, $SrO$, and $ZrO_4$. Particularly preferred among these oxides are $Al_2O_3$, $BaO$, $BeO$, $CaO$, $K_2O$, $Na_2O$, $MgO$, $SiO_2$, $SrO$, and $ZrO_4$. These oxides may be used in a single or composite form. Preferred examples of composite oxides include mullite ($3Al_2O_3 \cdot 2SiO_2$), steatite ($MgO \cdot SiO_2$), forsterite ($2MgO \cdot SiO_2$), and cordierite ($2MgO \cdot 2Al_2O_3 \cdot 5SiO_2$).

The insulating inorganic compound particle may be prepared under controlled conditions or ground to have a particle size of preferably from 0.1 μm to 20 μm, particularly preferably 0.2 μm to 15 μm.

The protective layer is formed by these electrically-conductive particle and/or particle having substantially no electrical conductivity and a binder. As the binder there may be used one which is used to prepare an electrode material mixture described later. For the proportion of particle and binder, the proportion of the particle to the total weight of the particle and the binder is preferably from 40% by weight to 96% by weight, more preferably 50% by weight to 94% by weight.

Other materials to be used in the preparation of the nonaqueous secondary battery of the present invention and processes for the preparation thereof will be further described hereinafter.

The positive and negative electrodes to be assembled into the nonaqueous secondary battery of the present invention can be prepared by applying a positive electrode material mixture or a negative electrode material mixture to a current collector. The positive or negative electrode material mixture may comprise a positive electrode active material or a negative electrode material having an electrically conductive agent, a binder, a dispersant, a filler, an tonically conductive agent, a pressure intensifier or various additives incorporated therein.

As the negative electrode material employable herein there may be used a carbonaceous compound or oxide and/or chalcogenide of transition metal or metal or semi-metal element belonging to the groups XIII to XV in the periodic table.

The carbonaceous compound employable herein may be selected from the group consisting of natural graphite, artificial graphite, gas phase-grown carbon, and carbon obtained by calcining an organic material. The carbonaceous compound preferably contains a graphite structure. The carbonaceous compound may comprise foreign compounds such as B, P, N, S, SiC and $B_4C$ incorporated therein besides carbon.

The negative electrode material of the present invention preferably mainly comprises a oxide and/or chalcogenide of transition metal or metal or semi-metal element belonging to the groups XIII to XV in the periodic table.

As the negative electrode material of the present invention there may be used a carbonaceous compound in combination with the oxide and/or chalcogenide of transition metal or metal or semi-metal element belonging to the groups XIII to XV in the periodic table.

A particularly preferred example of the transition metal compound employable herein is a single or composite oxide and/or chalcogenide of V, Ti, Fe, Mn, Co, Ni, Zn, W or Mo. Even more preferably, $Li_pCO_qV_{1-q}O_z$ (in which p is from 0.1 to 2.5, q is from 0 to 1, and z is from 1.3 to 4.5) described in JP-A-6-44972 can be used.

Examples of compounds of metal or semi-metal other than the transition metal include compounds of elements belonging to the groups XIII to XV in the periodic table, Ga, Si, Sn, Ge, Pb, Sb and Bi, singly or in combination.

Preferred examples of these compounds include $Ga_2O_3$, SiO, GeO, $GeO_2$, SnO, $SnO_2$, SnS, $SnSiO_3$, PbO, $PbO_2$, $Pb_2O_3$, $Pb_2O_4$, $Pb_3O_4$, $Sb_2O_3$, $Sb_2O_4$, $Bi_2O_3$, $Bi_2O_4$, $Bi_2O_5$, and $SnSiO_3$. These compounds may be used in the form of composite oxide with lithium oxide, such as $Li_2GeO_3$ and $Li_2SnO_2$.

The foregoing composite oxide and/or chalcogenide preferably stays mainly amorphous during the assembly of battery. The term "mainly amorphous" as used herein means that it has a broad scattering band having a peak between 20° and 40° in terms of a 2θ value as analyzed by X-ray diffractometry using CuKα ray. Such an amorphous material may have crystalline diffraction lines. The highest intensity of crystalline diffraction lines shown between 40° and 70° in terms of a 2θ value is preferably not more than 500 times, more preferably not more than 100 times, particularly not more than 5 times that of peak diffraction in a broad scattering band shown between 20° and 40° in terms of a 2θ range. Most preferably, the amorphous material shows no crystalline diffraction lines.

The foregoing composite oxide and/or chalcogenide is preferably a composite compound of three or more elements selected from the group consisting of B, Al, Ga, In, Tl, Si, Ge, Sn, Pb, P, As, Sb and Bi.

A particularly preferred example of the foregoing composite oxide and/or chalcogenide is a composite compound composed of three or more elements selected from the group consisting of B, Al, Si, Ge, Sn and P. These composite compounds may comprise elements belonging to the groups I to III in the periodic table or halogen elements incorporated therein to modify mainly the amorphous structure.

Particularly preferred among the foregoing negative electrode materials is an amorphous composite compound mainly comprising tin represented by formula (1):

$$SnM^1_aO_tS_u \qquad (1)$$

wherein $M^1$ represents two or more elements selected from the group consisting of Al, B, P, Si, Ge, elements belonging to the groups I to III in the periodic table, and halogen elements; a represents a number of from 0.2 to 2; t represents a number of from 1 to 6; and u represents a number of not more than 0.5.

Even more desirable among the compounds represented by formula (1) is a compound represented by formula (2):

$$SnM^2_bO_tS_u \qquad (2)$$

wherein $M^2$ represents two or more elements selected from the group consisting of Al, B, P, Ge, elements belonging to the groups I to III in the periodic table, and halogen elements; b represents a number of from 0.2 to 2; t represents a number of from 1 to 6; and u represents a number of not more than 0.5.

Even more desirable among the compounds represented by formula (1) is a compound represented by formula (3):

$$SnM^3_cM^4_dO_tS_u \qquad (3)$$

wherein $M^3$ represents at least one element selected from the group consisting of Al, B, P, Si and Ge; $M^4$ represents at least one element selected from the group consisting of elements belonging to the groups I to III in the periodic table, and halogen elements; c represents a number of from 0.2 to 2; d represents a number of from 0.01 to 1; t represents a number of from 1 to 6; and u represents a number of not more than 0.5, with the proviso that c and d satisfy the relationship of $0.2<c+d<2$.

$M^3$ and $M^4$ are each an element for making the compound of formula (3) amorphous as a whole. $M^3$ is an element which can be rendered amorphous. As $M^3$ there may be preferably used in combination two or more of Al, B, P, Si and Ge. $M^4$ is an element capable of modifying amorphous material. $M^4$ is selected from the group consisting of elements belonging to the groups I to III in the periodic table, and halogen elements, preferably K, Na, Cs, Mg, Ca, Ba, Y, and F. The suffix b is a number of from 0.2 to 2. The suffix c is a number of from 0.01 to 1. The suffixes b and c satisfy the relationship of $0.2<b+c<2$. The suffix t is a number of from 1 to 6.

The amorphous composite compound of the present invention may be subjected to either calcining or solution process, preferably calcining process. In a preferred embodiment of the calcining process, oxides or compounds of the elements described with reference to formula (1) are thoroughly mixed, and then calcined to obtain an amorphous composite compound.

Referring to the calcining conditions, the heating rate is preferably from 5° C. to 200° C. per minute, the calcining temperature is preferably from 500° C. to 1,500° C., the calcining time is preferably from 1 hour to 100 hours, and the cooling rate is preferably from 2° C. to $10^{7°}$ C. per minute.

The term "heating rate" as used herein means the average rate of temperature rise of from "50% of the calcining temperature (° C.)" to "80% of the calcining temperature (° C.)". The term "cooling rate" as used herein means the average rate of temperature drop of from "80% of the calcining temperature (° C.)" to "50% of the calcining temperature (° C.)".

The cooling of the calcined material may be accomplished by allowing the material to cool in the calcining furnace or by withdrawing it from the calcining furnace, and then putting it into water. Alternatively, an ultrarapid cooling method such as gun method, Hammer-Anvil method, slap method, gas atomizing method, plasma spray method, centrifugal rapid cooling method and melt drag method as described in "Ceramics Processing", Gihodo Shuppan, 1987, page 217 may be employed. Further, a single roller method and a double roller method as described in "New Glass Handbook", Maruzen, 1991, page 172, may be employed to cool the calcined material. In the case where the raw material can be melted during calcining, the calcined material may be continuously withdrawn while the raw material is being supplied during calcining. In this case, the molten material is preferably stirred during calcining.

The calcining gas atmosphere is preferably an atmosphere having an oxygen content of not more than 5 vol-%, more preferably an inert gas atmosphere. Examples of the inert gas include nitrogen, argon, helium, krypton, and xenon. The most desirable inert gas is pure argon.

The average particle size of the negative electrode material to be used in the present invention is preferably from 0.1 to 60 μm. In order to provide the predetermined particle size, well-known grinders or classifiers may be employed. For example, mortar, ball mill, sand mill, oscillating ball mill, satellite ball mill, planetary ball mill, pivoted air flow type jet mill or sieve may be employed. A wet grinding method which comprises grinding in the presence of water or an organic solvent such as methanol may be optionally effected. In order to provide the desired particle diameter, classification is preferably effected. The classification method is not specifically limited. A sieve, air classifier, etc. may be optionally used. The classification may be effected in either or both. of dry process and wet process.

Examples of the negative electrode material of the present invention will be given below, but the present invention should not be construed as being limited thereto.

$SnAl_{0.1}B_{0.3}P_{0.4}K_{0.2}O_{2.7}$, $SnAl_{0.1}B_{0.3}P_{0.4}Na_{0.2}O_{2.7}$, $SnAl_{0.1}B_{0.3}P_{0.4}Rb_{0.2}O_{2.7}$, $SnAl_{0.1}B_{0.3}P_{0.4}Cs_{0.2}O_{2.7}$, $SnAl_{0.1}B_{0.5}P_{0.5}Mg_{0.1}F_{0.2}O_{3.15}$, $SnAl_{0.1}B_{0.5}P_{0.5}Ba_{0.08}F_{0.08}O_{3.19}$, $SnAl_{0.2}B_{0.4}P_{0.4}O_{2.9}$, $SnAl_{0.3}B_{0.5}P_{0.2}O_{2.7}$, $SnAl_{0.3}B_{0.7}O_{2.5}$, $SnB_{0.2}P_{0.6}Ba_{0.08}F_{0.08}O_{2.84}$, $SnB_{0.4}P_{0.4}Ba_{0.1}F_{0.1}O_{2.65}$, $SnB_{0.5}P_{0.5}O_3$, $SnB_{0.5}P_{0.5}Mg_{0.1}O_{3.1}$, $SnB_{0.5}P_{0.5}Mg_{0.1}F_{0.2}O_3$, $SnB_{0.5}$, $P_{0.5}Li_{0.1}Mg_{0.1}F_{0.2}O_{3.05}$, $SnB_{0.5}P_{0.5}K_{0.1}Mg_{0.1}F_{0.2}O_{3.05}$, $SnB_{0.5}P_{0.5}K_{0.05}Mg_{0.05}F_{0.1}O_{3.03}$, $SnB_{0.5}P_{0.5}K_{0.05}Mg_{0.1}F_{0.2}O_{0.03}$, $SnB_{0.5}P_{0.5}Cs_{0.1}Mg_{0.1}F_{0.2}O_{3.05}$, $SnB_{0.5}P_{0.5}Cs_{0.05}Mg_{0.05}F_{0.1}O_{3.03}$, $SnB_{0.5}P_{0.5}Mg_{0.1}F_{0.1}O_{3.05}$, $SnB_{0.5}P_{0.5}Mg_{0.1}F_{0.2}O_3$, $SnB_{0.5}P_{0.5}Mg_{0.1}F_{0.06}O_{3.07}$, $SnB_{0.5}P_{0.5}Mg_{0.1}F_{0.14}O_{3.03}$, $SnPBa_{0.08}O_{3.58}$, $SnPK_{0.1}O_{3.55}$, $SnPK_{0.05}Mg_{0.05}O_{3.58}$, $SnPCs_{0.1}O_{3.55}$, $SnPBa_{0.08}F_{0.08}O_{3.54}$, $SnPK_{0.1}Mg_{0.1}F_{0.2}O_{3.55}$, $SnPK_{0.05}Mg_{0.05}F_{0.1}O_{3.53}$, $SnPCs_{0.1}Mg_{0.1}F_{0.2}O_{3.55}$, $SnPCs_{0.05}Mg_{0.05}F_{0.1}O_{3.53}$, $Sn_{1.1}B_{0.2}P_{0.6}Ba_{0.08}F_{0.08}O_{2.94}$, $Sn_{1.1}B_{0.2}P_{0.6}Li_{0.1}K_{0.1}Ba_{0.1}F_{0.1}O_{3.05}$, $Sn_{1.1}B_{0.4}P_{0.4}Ba_{0.08}O_{2.74}$, $Sn_{1.1}PCs_{0.05}O_{3.63}$, $Sn_{1.1}PK_{0.05}O_{3.63}$, $Sn_{1.2}Al_{0.1}B_{0.3}P_{0.4}Cs_{0.2}O_{2.9}$, $Sn_{1.2}B_{0.2}P_{0.6}Ba_{0.08}O_{3.08}$, $Sn_{1.2}B_{0.2}P_{0.6}Ba_{0.08}O_{3.04}$, $Sn_{1.2}B_{0.2}P_{0.6}Mg_{0.04}Ba_{0.04}O_{3.08}$, $Sn_{1.2}B_{0.3}P_{0.5}Ba_{0.08}O_{2.98}$, $Sn_{1.3}Al_{0.1}B_{0.3}P_{0.4}Na_{0.2}O_3$, $Sn_{1.3}B_{0.4}P_{0.4}Ca_{0.2}O_{3.1}$, $Sn_{1.3}B_{0.4}P_{0.4}Ba_{0.2}O_{3.1}$, $Sn_{1.4}PK_{0.2}O_4$, $Sn_{1.4}Ba_{0.1}PK_{0.2}O_{4.15}$, $Sn_{1.4}Ba_{0.2}PK_{0.2}O_{4.3}$, $Sn_{1.4}Ba_{0.2}PK_{0.2}Ba_{0.1}F_{0.2}O_{4.3}$, $Sn_{1.4}PK_{0.3}O_{4.05}$, $Sn_{1.5}PK_{0.2}O_{4.1}$, $Sn_{1.5}PK_{0.1}O_{4.05}$, $Sn_{1.5}PCs_{0.05}O_{4.03}$, $Sn_{1.5}PCs_{0.05}Mg_{0.1}F_{0.2}O_{4.03}$, $Sn_2P_2O_7$, $SnSi_{0.5}Al_{0.1}B_{0.2}P_{0.1}Ca_{0.4}O_{3.1}$, $SnSi_{0.4}Al_{0.2}B_{0.4}O_{2.7}$, $SnSi_{0.5}Al_{0.2}B_{0.1}P_{0.1}Mg_{0.1}O_{2.8}SnSi_{0.6}Al_{0.2}B_{0.2}O_{2.8}$, $SnSi_{0.5}Al_{0.3}B_{0.4}P_{0.2}O_{3.55}$, $SnSi_{0.5}Al_{0.3}B_{0.4}P_{0.5}O_{4.30}$, $SnSi_{0.6}Al_{0.1}B_{0.1}P_{0.3}O_{3.25}$, $SnSi_{0.6}Al_{0.1}B_{0.1}P_{0.1}Ba_{0.2}O_{2.95}$, $SnSi_{0.6}Al_{0.1}B_{0.1}P_{0.1}Ca_{0.2}O_{2.95}$, $SnSi_{0.6}Al_{0.1}B_{0.2}Mg_{0.2}O_{2.85}$, $SnSi_{0.6}Al_{0.1}B_{0.3}P_{0.1}O_{3.05}$, $SnSi_{0.6}Al_{0.2}Mg_{0.2}O_{2.7}$, $SnSi_{0.6}Al_{0.2}Ca_{0.2}O_{2.7}$, $SnSi_{0.6}Al_{0.2}P_{0.2}O_3$, $SnSi_{0.6}B_{0.2}P_{0.2}O_3$, $SnSi_{0.8}Al_{0.2}O_{2.9}$, $SnSi_{0.8}Al_{0.3}B_{0.2}P_{0.2}O_{3.85}$, $SnSi_{0.8}B_{0.2}O_{2.9}$, $SnSi_{0.8}Ba_{0.2}O_{2.8}$, $SnSi_{0.8}Mg_{0.2}O_{2.8}$, $SnSi_{0.8}Ca_{0.2}O_{2.8}$, $SnSi_{0.8}P_{0.2}O_{3.1}$, $Sn_{0.9}Mn_{0.3}B_{0.4}P_{0.4}Ca_{0.1}Rb_{0.1}O_{2.95}$, $Sn_{0.9}Fe_{0.3}B_{0.4}P_{0.4}Ca_{0.1}Rb_{0.1}O_{2.95}$, $Sn_{0.8}Pb_{0.2}Ca_{0.1}P_{0.9}O_{3.35}$, $Sn_{0.3}Ge_{0.7}Ba_{0.1}P_{0.9}O_{3.35}$, $Sn_{0.9}Mn_{0.1}Mg_{0.1}P_{0.9}O_{3.35}$, $Sn_{0.2}Mn_{0.8}Mg_{0.1}P_{0.9}O_{3.35}$, $Sn_{0.7}Pb_{0.3}Ca_{0.1}P_{0.9}O_{3.35}$, $Sn_{0.2}Ge_{0.8}Ba_{0.1}P_{0.9}O_{3.35}$, $SnAl_{0.3}B_{0.5}P_{0.2}O_{2.7}S_{0.01}$, $SnAl_{0.2}B_{0.4}P_{0.4}O_{2.85}$, $S_{0.05}$, $SnB_{0.2}P_{0.5}K_{0.1}Mg_{0.1}Ge_{0.1}O_{2.7}S_{0.1}$.

The chemical formula of the compound obtained by calcining can be determined by induction coupled plasma (ICP) emission spectroscopic analysis or simply calculated from the difference in weight between before and after calcining.

The negative electrode material of the present invention may comprise various elements. Examples of these elements to be incorporated as dopants in the negative electrode material include lanthanoid metals (e.g., Hf, Ta, W, Re, Os, Ir, Pt, Au, Hg), and various electronically conductive compounds (e.g., Sb, In and Nb compounds). The amount of such compounds to be incorporated in the negative electrode material is preferably from 0 to 5 mol-%.

The surface of the oxide to be used as a positive electrode active material or negative electrode material herein may be covered with an oxide having a chemical formula different from that of the positive electrode active material or negative electrode material used. The surface oxide preferably contains a compound soluble in both an acidic and alkaline materials. A metal oxide having a high electronic conductivity is more preferred. Examples of such a metal oxide include $PbO_2$, $Fe_2O_3$, $SnO_2$, $In_2O_2$, and ZnO. These oxides preferably comprise dopants (e.g., metal having a valency different from the foregoing metals in the form of oxide, halogen element) incorporated therein. Particularly preferred examples of these metal oxides include $SiO_2$, $SnO_2$, $Fe_2O_3$, ZnO, and $PbO_2$. The amount of the metal oxide to be used in the foregoing surface treatment is preferably from 0.1 to 10% by weight, particularly from 0.2 to 5% by weight, most preferably from 0.3 to 3% by weight based on the weight of the positive electrode active material or negative electrode material.

Further, the surface of the positive electrode active material or negative electrode material may be modified. For example, the surface of the metal oxide may be treated with an esterifying agent, a chelating agent, an electrically-conductive high molecular compound, a polyethylene oxide or the like.

The positive electrode active material to be used in the present invention may be an oxide of transition metal capable of reversibly intercalating/deintercalating lithium ion. In particular, a lithium-containing transition metal oxide is desirable. Preferred examples of the lithium-containing transition metal oxide employable herein as a positive electrode active material include lithium-containing Ti, V, Cr, Mn, Fe, Co, Ni, Cu, Mo and W oxides. The transition metal may be mixed with an alkaline metal other than lithium (the group IA and IIA elements in the periodic table), and/or Al, Ga, In, Ge, Sn, Pb, Sb, Bi, Si, P, B, etc. The amount of these elements to be incorporated is preferably from 0 to 30 mol-% based on the transition metal.

In a preferred embodiment of the present invention, the lithium-containing transition metal oxide to be used as a positive electrode active material is obtained by mixing a lithium compound and a transition metal compound (transition metal: at least one selected from the group consisting of Ti, V, Cr, Mn, Fe, Co, Ni, Mo, and W) in a total molar ratio of from 0.3 to 2.2, and then processing the mixture.

In a particularly preferred embodiment of the present invention, the lithium-containing transition metal oxide to be used as a positive electrode active material is obtained by mixing a lithium compound and a transition metal compound (transition metal: at least one selected from the group consisting of V, Cr, Mn, Fe, Co, and Ni) in a total molar ratio of from 0.3 to 2.2, and then processing the mixture.

A particularly preferred lithium-containing transition metal oxide to be used as a positive electrode active material is $Li_xQO_y$ (in which Q is mainly composed of a transition metal containing at least one of Co, Mn, Ni, V and Fe, x represents a number of from 0.2 to 1.2, and y represents a number of from 1.4 to 3). Q comprises Al, Ga, In, Ge, Sn, Pb, Sb, Bi, Si, P, B, etc., besides transition metals. The amount of these elements to be incorporated in Q is preferably from 0 to 30 mol-% based on the amount of transition metals.

Preferred examples of the lithium-containing metal oxide to be used as a positive electrode active material herein include $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_2$, $Li_xMn_cFe_{2-c}O_4$, $Li_xCo_bB_{1-b}O_2$, $Li_xCo_bSi_{1-b}O_2$, mixture of $Li_xMn_2O_4$ and $MnO_2$, mixture of $Li_{2x}MnO_3$ and $MnO_2$, and mixture of $Li_xMnO_4$, $Li_{2x}MnO_3$ and $MnO_2$ (in which x represents a number of 0.02 to 1.2, a represents a number of 0.1 to 0.9, b represents a number of 0.8 to 0.98, c represents a number of 1.6 to 1.96, and z represents a number of 2.01 to 5).

Preferred examples of the lithium-containing metal oxide to be used as a positive electrode active material herein include $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (in which x represents a number of 0.02 to 1.2, a represents a number of 0.1 to 0.9, b represents a number of 0.8 to 0.98, c represents a number of 1.6 to 1.96, and z represents a number of 2.01 to 2.3).

The most desirable examples of the lithium-containing transition metal oxide to be used as a positive electrode active material herein include $Li_xCoO_2$, $Li_xNiO_2$, $Li_xMnO_2$, $Li_xCo_aNi_{1-a}O_2$, $Li_xMn_2O_4$, $Li_xCo_bV_{1-b}O_z$ (in which x represents a number of 0.02 to 1.2, a represents a number of 0.1 to 0.9, b represents a number of 0.9 to 0.98, and z represents a number of 2.02 to 2.3). The foregoing x value is defined before the beginning of charge and discharge. Thus, x is changed by charge or discharge of the battery.

The positive electrode active material can be synthesized by a process which comprises mixing a lithium compound and a transition metal compound, and then calcining the mixture or by solution reaction. In particular, the calcining process is desirable. The calcining temperature to be used in the present invention may be such that the compound mixture to be used in the present invention is partly decomposed and melted, preferably from 250° C. to 2,000° C., particularly from 350° C. to 1,500° C. In the calcining process, the material is preferably calcined at a temperature of from 250° C. to 900° C. The calcining time is preferably from 1 to 72 hours, more preferably from 2 to 20 hours. The mixing method of raw materials may be effected in either a dry process or wet process. The material thus calcined may be annealed at a temperature of from 200° C. to 900° C.

The gas atmosphere in which calcining is effected is not specifically limited. Either an oxidizing atmosphere or reducing atmosphere may be employed. Examples of such an atmosphere include air, gas having a predetermined oxygen concentration, hydrogen, carbon monoxide, nitrogen, argon, helium, krypton, xenon, and carbon dioxide.

As the process for chemically intercalating lithium ion into the transition metal oxide during the synthesis of the positive electrode active material of the present invention there is preferably employed a process which comprises reacting metallic lithium, lithium alloy or butyl lithium with a transition metal oxide.

The average particle size of the positive electrode active material to be used in the present invention is not specifically limited but is preferably from 0.1 to 50 μm. The specific surface area of the positive electrode active material is not specifically limited but is preferably from 0.01 to 50 $m^2/g$ as determined by BET method. The pH value of the supernatant liquid in a solution of 5 g of the positive electrode active material in 100 ml of distilled water is preferably from 7 to 12.

In order to provide the predetermined particle size, well-known grinders or classifiers may be employed. For example, mortar, ball mill, oscillating ball mill, oscillating mill, satellite ball mill, planetary ball mill, pivoted air flow type jet mill or sieve may be employed.

The positive electrode active material obtained by calcining may be washed with water, an acidic aqueous solution, an alkaline aqueous solution or an organic solvent before use.

A preferred combination of a negative electrode material and a positive electrode active material to be used in the present invention is a combination of a compound represented by formula (1) and $Li_xCoO_2$, $Li_xNiO_2$, $Li_xCo_aNi_{1-a}O_2$, $Li_xMnO_2$, $Li_xMn_2O_4$ or $Li_xCo_bV_{1-b}O_z$ (in which x represents a number of 0.02 to 1.2, a represents a number of 0.1 to 0.9, b represents a number of 0.9 to 0.98, and z represents a number of 2.02 to 2.3). Such a combination can provide a nonaqueous secondary battery which can discharge at a high discharging voltage and shows a high capacity and an excellent charge-discharge cycle characteristics.

The amount of lithium to be incorporated in the negative electrode material of the present invention is from 3 to 10 equivalents. The ratio of lithium to the positive electrode active material is determined on the basis of this value. The ratio thus determined is preferably multiplied by a factor of 0.5 to 2. In the case where the lithium supply source is other than the positive electrode active material (e.g., metallic lithium, lithium alloy, butyl lithium), the amount of the positive electrode active material to be used is determined on the basis of the equivalent of lithium to be deintercalated from the negative electrode material. In this case, too, the ratio thus determined is preferably multiplied by a factor of 0.5 to 2.

The electrode material mixture may comprise an electrically conductive agent, a binder, a filler, etc. As such an electrically conductive agent there may be used any electronically conductive material which undergoes no chemical change in the battery thus assembled. In general, electrically-conductive materials such as natural graphite (e.g., flake graphite, scaly graphite, earthy graphite), artificial graphite, carbon black, acetylene black, Ketjen black, carbon fiber, metal (e.g., copper, nickel, aluminum, silver) powder, metal fiber and polyphenylene derivative may be used singly or in admixture. Particularly preferred among these electrically-conductive materials are combination of graphite and acetylene black. The amount of these electrically-conductive materials to be incorporated is preferably from 1 to 50% by weight, more preferably from 2 to 30% by weight, particularly from 2 to 15% by weight if they are carbon black or graphite.

As binders there may be normally used polysaccharides, thermoplastic resins and polymers having rubber elasticity such as starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylene-diethane polymer (EPDM), sulfonated EPDM, styrene-butadiene rubber, polybutadiene, fluororubber and polyethylene oxide, singly or in admixture. If a compound having a functional group which reacts with lithium such as polysaccharides is used, a compound such as isocyanate group is preferably added to deactivate the functional group. The amount of the binder to be added is preferably from 1 to 50% by weight, particularly preferably from 2 to 30% by weight.

As the filler there may be used any fibrous material which undergoes no chemical change in the battery thus assembled. In general, an olefinic polymer such as polypropylene and polyethylene, glass, carbon, etc. may be used in the form of fiber. The amount of the filler to be incorporated is not specifically limited but is preferably from 0 to 30% by weight.

In order to use the negative electrode material of the present invention in a nonaqueous secondary battery, a water-dispersed negative electrode material mixture paste containing the compound of the present invention is applied to a current collector on which it is then dried. The pH value of the water-dispersed electrode material mixture paste is from 5 to 10, preferably from 6 to 9. Further, the temperature of the water-dispersed paste is kept to a range of from 5° C. to lower than 80° C. The paste is preferably applied to the current collector within 7 days after preparation.

As the separator there may be used an insulating microporous material or an insulating material with void, having a great permeability to ion and a predetermined mechanical strength. In order to enhance the safety, the separator needs to be capable of blocking the voids and hence raise the resistivity to an extent such that the current passage is broken at a temperature of not lower than 80° C. The temperature at which these voids are blocked is preferably from not lower than 90° C. to not higher than 180° C., more preferably from not lower than 110° C. to not higher than 170° C.

The process for the formation of voids depends on the kind of the material used. In practice, however, any known process may be employed. In the case of porous film, the shape of pores is normally circle or ellipse. The size of pores is from 0.05 to 30 $\mu$m, preferably from 0.1 to 20 $\mu$m. Alternatively, the shape of pores may be rod-like or amorphous as formed by stretching method, phase separation method or the like. In the case of cloth, voids occur between fibers and thus depend on the production method of woven or nonwoven. The proportion of these voids in the separator material, i.e., percent void is from 20% to 90%, preferably from 35% to 80%.

The separator of the present invention is a microporous film or woven or nonwoven fabric having a thickness of from 5 $\mu$m to 100 $\mu$m, preferably from 10 $\mu$m to 80 $\mu$m.

The separator of the present invention preferably has an ethylene content of at least 20% by weight, particularly not less than 30% by weight. Examples of components to be incorporated in the separator other than ethylene include propylene, butene, hexene, ethylene fluoride, vinyl chloride, vinyl acetate, and acetalated vinyl alcohol. Particularly preferred among these components are propylene and ethylene fluoride.

As the microporous film there is preferably used one made of polyethylene, ethylene-propylene copolymer or ethylene-butene copolymer. Further, polyethylene and polypropylene or polyethylene and polyethylene tetrafluoride may be mixed and dissolved to prepare the desired microporous film.

As the nonwoven or woven fabric there is preferably used one woven of polyethylene fiber, ethylene-propylene copolymer fiber, ethylene-butene 1 copolymer fiber, ethylene-methyl butene copolymer fiber, ethylene-methyl pentene copolymer fiber, polypropylene fiber or polyethylene tetrafluoride fiber having a diameter of from 0.1 $\mu$m to 5 $\mu$m.

The foregoing separator may be made of single material or composite material. In particular, a laminate of two or more microporous films having different pore diameters, percent voids and pore blocking temperatures or composite of different forms of materials such as composite of microporous film and nonwoven fabric, composite of microporous film and woven fabric and nonwoven fabric and paper are desirable.

The separator of the present invention may comprise an inorganic fiber such as glass fiber and carbon fiber or particulate inorganic material such as silicon dioxide, zeolite, alumina and talc particles. The separator of the present invention may be treated with a surface active agent on the voids or surface thereof to render itself hydrophilic.

The electrolyte to be contained in the battery comprises at least one of aprotic organic solvents and one or more lithium salts soluble therein. Examples of these organic solvents include propylene carbonate, ethylene carbonate, butylene carbonate, dimethyl carbonate, diethyl carbonate, $\gamma$-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, methyl propionate, ethyl propionate, phosphoric acid triester, trimethoxymethane, dioxolane derivative, sulfolane, 3-methyl-2-oxazolidinone, propylene carbonate derivative, tetrahydrofuran derivative, diethyl ether and 1,3-propanesultone. Preferred among these organic solvents are esters carbonate. Even more desirable among these esters carbonate are propylene carbonate, ethylene carbonate, butylene carbonate, dimethyl carbonate, and diethyl carbonate.

Examples of the lithium salt to be dissolved in these aprotic organic solvents include $LiClO_4$, $LiBF_4$, $LiPF_6$, $LiCF_3SO_3$, $LiCF_3CO_2$, $LiAsF_6$, $LiSbF_6$, $LiB_{10}C_{10}$, lower aliphatic lithium carboxylate, $LiAlCl_4$, LiCl, LiBr, LiI, chloroboran lithium, and lithium tetraphenylborate. Particularly preferred among these lithium salts are $LiClO_4$, $LiBF_4$, $LiPF_6$, and $LiCF_3SO_3$.

In particular, an electrolytic solution comprising $LiCF_3SO_3$, $LiClO_4$, $LiBF_4$ and/or $LiPF_6$ incorporated in a mixture of propylene carbonate or ethylene carbonate and 1,2-dimethoxyethane and/or diethyl carbonate is desirable. Further, an electrolytic solution comprising $LiBF_4$ and/or $LiPF_6$ incorporated in a mixture of ethylene carbonate and diethyl carbonate is particularly desirable.

The amount of the electrolytic solution to be incorporated in the battery is not specifically limited. In practice, however, a required amount of the electrolytic solution may be used depending on the amount of the positive electrode active material or negative electrode material or the battery size. The concentration of the supporting electrolyte is preferably from 0.2 to 3 mols per l of the electrolytic solution. The temperature at which the electrolytic solution is injected into the battery is preferably from −20° C. to 50° C., more preferably from −20° C. to 40° C., particularly from −10° C. to 30° C. It is preferred that both the electrolytic solution and the battery can be cooled during the injection of the electrolytic solution into the battery.

Besides the electrolytic solution, the following solid electrolytes may be used. Solid electrolytes can be divided into two groups, i.e., inorganic solid electrolyte and organic solid electrolyte. As inorganic solid electrolytes there are well known nitride, halide and oxygen acid salt of Li. Particularly useful among these compounds are $Li_3N$, LiI, $Li_5NI_2$, $Li_3N$—LiI—LiOH, $LiSiO_4$, $LiSiO_4$—NiI—LiOH, $xLi_3PO_4$-(1−x)$Li_4SiO_4$, $Li_2SiS_3$, and phosphorus sulfide compound.

Useful examples of organic solid electrolytes include polyethylene oxide derivative, polymer containing such the derivative, polypropylene oxide derivative, polymer containing such the derivative, polymer containing an ion dissociating group, mixture of polymer containing an ion dissociating group and the foregoing aprotic electrolytic solution, and phosphoric acid ester polymer.

A polyacrylonitrile may be added to the electrolytic solution. Further, the combined use of an inorganic solid electrolyte and an organic solid electrolyte has been known.

It is well-known to incorporate the following compounds in the electrolyte for the purpose of improving the discharge or charge-discharge characteristics of the battery. Examples of such compounds include pyridine, triethyl phosphite, triethanolamine, cyclic ether, ethylenediamine, n-glyme, triamide hexaphosphate, nitrobenzene derivative, sulfur, quinoneimine dye, combination of N-substituted oxazolidinone and N,N'-substituted imidazolidinone, ethylene glycol dialkyl ether, quaternary ammonium salt, polyethylene glycol, pyrrole, 2-methoxyethanol, $AlCl_3$, monomer constituting electrically-conductive polymer as an electrode active material, triethylene phosphormaide, trialkyl phosphine, morpholine, aryl compound having a carbonyl group, combination of hexamethylphosphoric triamide and 4-alkylmorpholine, bicyclic tertiary amine, oil (JP-A-62-287,580), quaternary phosphonium salt, and tertiary sulfonium salt.

The electrolytic solution may comprise a halogen-containing solvent such as carbon tetrachloride and ethylene chloride trifluoride incorporated therein to render itself incombustible. Further, the electrolytic solution may comprise carbon dioxide gas incorporated therein to render itself preservable at high temperatures. The positive electrode active material mixture or negative electrode material mixture may comprise an electrolytic solution. It is known that the positive electrode active material mixture or negative electrode material mixture may comprise the foregoing ionically-conductive polymer or nitromethane or electrolyte.

As the current collector for the positive electrode and negative electrode there may be used any electronically-conductive material which undergoes no chemical change in the battery thus assembled. For the positive electrode, for example, stainless steel, nickel, aluminum, titanium, carbon, etc. may be used. Besides these materials, aluminum or stainless steel treated with carbon, nickel, titanium or silver on the surface thereof may be used.

In particular, aluminum or aluminum alloy is desirable. For the negative electrode, stainless steel, nickel, copper, titanium, aluminum, carbon, etc. may be used. Besides these materials, copper or stainless steel treated with carbon, nickel, titanium or silver on the surface thereof or Al-Cd alloy may be used. In particular, copper or copper alloy is desirable. These materials may be oxidized on the surface thereof. It is desirable that these materials be subjected to surface treatment to roughen the surface of the current collector. Referring to the shape of the current collector, the current collector may be in the form of foil, film, sheet, net, punched form or formed product such as lath form, porous form, foam and fiber group. The thickness of the current collector is not specifically limited. In practice, however, it may be from 1 to 500 $\mu$m.

The shape of the battery may be any of coin, button, sheet, cylinder, plate and rectangular form. If the shape of the battery is coin or button, the compound of positive electrode active material and negative electrode material are normally compressed into pellets. The thickness and diameter of these pellets are determined depending on the battery size. If the shape of the battery is sheet, cylinder or rectangular form, the compound of positive electrode active material mixture and negative electrode material mixture are normally applied to the current collector, dried, and then compressed. The application of the material mixture to the collector can be accomplished by any ordinary coating method.

Examples of such a coating method include reverse-roll coating method, direct-roll coating method, blade coating method, knife coating method, extrusion coating method, curtain coating method, gravure coating method, bar coating method, dip coating method, and squeeze coating method. Preferred among these coating methods are blade coating method, knife coating method, and extrusion coating method. The coating is preferably effected at a rate of from 0.1 to 100 m/min. The coating method can be properly selected depending on the solution-physical properties and dryability of the material mixture to provide the coating layer with excellent surface conditions. The coating may be effected successively from one side to another or simultaneously on both sides. The coating may be effected continuously, intermittently or in stripe. The thickness, length and width of the coating layer are determined depending on the battery size. In practice, however, the thickness of the coating layer on one side of the current collector is preferably from 1 to 2,000 $\mu$m in dried and compressed form.

The drying or dehydration of pellet or sheet can be accomplished by any commonly used method. In particular, hot air, vacuum, infrared rays, far infrared rays, electron rays and low humidity air may be preferably used singly or in combination. The drying or dehydration temperature is preferably from 80° C. to 350° C., particularly from 100° C. to 250° C. From the standpoint of cycle characteristics, the water content in the entire battery is preferably not more than 2,000 ppm and the water content in the positive electrode material mixture, negative electrode material mixture and electrolyte each are preferably not more than 500 ppm based on the weight of the entire battery. The compression of pellet or sheet can be accomplished by any commonly used method, particularly mold pressing method or calender pressing method. The compression pressure is not specifically limited. In practice, however, it is preferably from 0.2 to 3 t/cm$^2$. The calender pressing is preferably effected at a rate of 0.1 to 50 m/min and a temperature of from room temperature to 200° C. The ratio of the width of the negative electrode sheet to that of the positive electrode sheet is preferably from 0.9 to 1.1, particularly from 0.95 to 1.0. The ratio of the content of the positive electrode active material to that of the negative electrode material depends on the kind or formulations of the material mixture and thus cannot be defined. In practice, however, it can be determined to an optimum value from the standpoint of volume, cycle characteristics and safety.

The foregoing material mixture sheet and separator are laminated. The laminate is then inserted into a can in a coiled or folded form so that it is electrically connected to the can. The can is then filled with the electrolytic solution. The can is then sealed with a sealing plate to form a can battery. An explosion-proof valve may be used as a sealing plate. The battery may be provided with various known explosion-proof elements besides the explosion-proof valve. For example, fuse, bimetal, PTC element, etc. may be used as an overcurrent preventive element. In order to cope with the rise in the internal pressure in the can battery other than by explosion-proof valve, the battery may be notched. Alternatively, the gasket or sealing plate may be provided with cracks. Further, the battery may be designed to disconnect the battery elements from the lead plate in emergency. Alternatively, the charger may be equipped with or connected to a protective circuit for countermeasure against overcharging or overdischarging.

As a countermeasure against overcharging, the battery may be equipped with a system by which current passage is broken by the rise in the inner pressure in the battery. To this end, the electrolyte or electrode material mixture may comprise a compound for raising the inner pressure in the battery. Examples of the compound to be used to raise the inner pressure in the battery include carbonates such as $Li_2CO_3$, $LiHCO_3$, $Na_2CO_3$, $NaHCO_3$, $CaCO_3$ and $MgCO_3$.

As the can or lead plate there may be used an electrically-conductive metal or alloy. Examples of such a metal or alloy include metals such as iron, nickel, titanium, chromium, molybdenum, copper and aluminum, and alloy thereof. The welding of the cap, can, sheet and lead plate can be accomplished by any well-known method (e.g., D.C. or A.C. electric welding, laser welding, ultrasonic welding). As the sealing agent there may be used any known compound such as asphalt or mixture thereof.

The application of the nonaqueous secondary battery of the present invention is not specifically limited. If mounted on electronic equipment, the nonaqueous secondary battery of the present invention can be used in color note personal computer, black-and-white note personal computer, pen-touch personal computer, pocket (palm-top) personal computer, note type word processor, pocket word processor, electronic book player, portable telephone, cordless phone slave receiver, pager, handy terminal, portable facsimile, portable copying machine, portable printer, headphone stereo, video movie, liquid crystal television, handy cleaner, portable CD, mini-disc, electric shaver, electronic translating machine, automobile telephone, transceiver, electric tool, electronic note, electric calculator, memory card, tape recorder, radio, backup power supply, etc. Other examples of consumers' appliances to which the nonaqueous secondary battery of the present invention can be applied include automobile, electric vehicle, motor, lighting fixture, toy, game device, road conditioner, electric iron, watch, strobe, camera, and medical equipment (e.g., pace maker, hearing aid, shoulder massager). Further, the nonaqueous secondary battery of the present invention can be used for various military and cosmic use. Moreover, the nonaqueous secondary battery of the present invention can be combined with a solar battery.

A preferred combination of the present invention is a combination of desirable components among the foregoing chemical materials and battery parts. A particularly preferred combination comprises at least one compound selected from the group consisting of $Li_xCoO_2$, $Li_xNiO_2$, $Li_xMnO_2$ and $Li_xMnO_4$ (in which x=0.02 to 1.2) as a positive electrode active material and acetylene black as an electrically conductive agent.

The positive electrode current collector is made of stainless steel or aluminum. The positive electrode current collector is in the form of net, sheet, foil, lath or the like. As the negative electrode material there may be preferably used a compound containing at least one of lithium metal, lithium alloy (Li—Al), carbonaceous compound, oxide ($LiCoVO_4$, $SnO_2$, $SnO$, $SiO$, $GeO_2$, $GeO$, $SnSiO_3$, $SnSi_{0.3}Al_{0.1}B_{0.2}P_{0.3}O_{3.2}$), sulfide ($TiS_2$, $SnS_2$, $SnS$, $GeS_2$, $GeS$), etc. The negative electrode current collector is made of stainless steel or copper. The negative electrode current collector is in the form of net, sheet, foil, lath or the like. The compound to be used with the positive electrode active material mixture or negative electrode material mixture may comprise as an electronically-conductive agent a carbonaceous material such as acetylene black and graphite. As the binder there may be used a fluorine-containing thermoplastic compound such as polyvinylidene fluoride and polyfluoroethylene and an elastomer such as polymer containing acrylic acid, styrene-butadiene rubber and ethylene propylene terpolymer, singly or in admixture. As the electrolytic solution there may be preferably used a combination of a cyclic or noncyclic carbonate such as ethylene carbonate, diethyl carbonate and dimethyl carbonate and an ester compound such as ethyl acetate. As the supporting electrolyte there may be used $LiPF_6$, preferably in admixture with a lithium salt such as $LiBF_4$ and $LiCF_3SO_3$. The separator is preferably made of a polypropylene or polyethylene, singly or in combination. The shape of the battery may be any of cylinder, plate and rectangular form. The battery is preferably provided with a means of securing safety even against malfunction (e.g., inner pressure-releasing type explosion-proof valve, current-blocking type explosion-proof valve, separator which increases its resistivity at high temperatures).

EXAMPLE

The present invention will be further described in the following examples, but the present invention should not be construed as being limited thereto.

Example 1

86 parts by weight of $SnB_{0.2}P_{0.5}K_{0.1}Mg_{0.1}Ge_{0.1}O_{2.8}$ (average particle diameter: 7.5 $\mu$m) as a negative electrode material and 3 parts by weight of acetylene black and 6 parts by weight of graphite as electrically conductive agents were mixed. To the mixture were then added 4 parts by weight of a polyvinylidene fluoride and 1 part by weight of a carboxymethyl cellulose as binders. The mixture was then kneaded with water as a medium to obtain a negative electrode material mixture slurry. The slurry thus obtained was applied to the both sides of a copper foil having a thickness of 10 $\mu$m by means of an extrusion type coating machine, and then dried to obtain a negative electrode compound sheet.

Subsequently, 79 parts by weight of α-alumina, 18 parts by weight of graphite, and 3 parts by weight of a carboxymethyl cellulose were kneaded with water as a medium to obtain an auxiliary layer slurry. The slurry thus obtained was applied to the foregoing negative electrode material mixture sheet, dried, and then compression-molded under a calender press to prepare a belt-like negative electrode sheet precursor having a thickness of 98 $\mu$m, a width of 55 mm and a length of 520 mm.

A nickel lead plate was spot-welded to the negative electrode sheet precursor which was then dehydrated and dried at a temperature of 230° C. in air having a dew point of not higher than −40° C. for 30 minutes.

12 sheets of a lithium foil (purity: 99.5%) having a thickness of 40 $\mu$m and a size of 20 mm×55 mm were then pressed to both sides of the foregoing sheet. The pressing was accomplished by a process which comprises transferring the lithium foil onto a polyethylene roller having a diameter of 300 mm, and then applying the lithium foil to both sides of the sheet under the simultaneous application of a pressure of 5 kg/cm². The covering percent of the negative electrode sheet by the lithium foil was 40%.

87 parts by weight of $LiCoO_2$ as a positive electrode active material and 3 parts by weight of acetylene black and 6 parts by weight of graphite as electrically conductive agents were mixed. To the mixture were then added 3 parts by weight of Nipol 820B (available from Nippon Zeon Co., Ltd.) and 1 part by weight of a carboxymethyl cellulose as binders. The mixture was then kneaded with water as a medium to obtain a positive electrode material mixture slurry.

The slurry thus obtained was applied to both sides of an aluminum foil having a thickness of 20 $\mu$m by an extrusion type coating machine, dried, and then compression-molded under a calender press to prepare a belt-like positive electrode sheet (1) having a thickness of 260 $\mu$m, a width of 53 mm and a length of 445 mm. An aluminum lead plate was welded to an end of the positive electrode sheet which was then dehydrated and dried at a temperature of 230° C. in dried air having a dew point of not higher than −40° C. for 30 minutes.

The positive electrode sheet (1) which had been subjected to heat treatment, a microporous polyethylene/polypropylene film separator (3), a negative electrode sheet (2), and the separator (3) were laminated in this order. The laminate was spirally wound.

The laminate thus wound was then put into a closed-end cylindrical nickel-plated iron battery can (4) which serves as a negative electrode terminal. A 1 mol/l of $LiPF_6$ solution (in a 2:8 (by weight) mixture of ethylene carbonate and diethyl carbonate) was then injected into a battery can as an electrolyte while the battery can was being cooled to a temperature of 0° C. The open end of the battery was then cramped with a battery lid (5) having a positive electrode terminal with a gasket (6) interposed therebetween to prepare a cylindrical battery having a height of 65 mm and an outer diameter of 18 mm as shown in FIG. 1. The positive electrode terminal (5) had been previously connected to the positive electrode sheet (1) through a lead terminal. The battery can (4) had been previously connected to the negative electrode sheet through a lead terminal. The reference numeral (7) indicates explosion-proof valve.

The battery thus cramped was aged at 3° C. for 2 hours and at 25° C. for 15 hours, charged with a constant voltage at 25° C. and a current density of 0.4 mA/cm² to 3.1 V, and then aged at 50° C. for 2 weeks. After 3 days from ageing, the battery showed an open-circuit voltage of 2.58 V.

After the termination of ageing, the battery was charged at a current density of 1 mA/cm² to 4.1 V, and then discharged at a current density of 1 mA/cm² to 2.8 V. For the determination of the charge-discharge capacity of the battery, the charging was carried out at a current density of 1 mA/cm² to 4.1 V, and then the discharging was carried out at a current density of 0.5 mA/cm² to 2.8 V. The battery was then subjected to cycle test at a current density of 2.5 mA/cm² over a voltage range of from 2.8 V to 4.1 V. The battery was then measured for the capacity ratio (i.e., the ratio of the discharge capacity after 300 cycles to the ratio of the discharge capacity after 300 cycles to the initial discharge capacity). The results are shown in Table (Battery No. 1). Similarly, Battery Nos. 2 to 12, a, b, c aNd d were subjected to test under the conditions shown in Table 1. The results are shown in Table 1.

The term "pre-charging" shown in Table 1 means the foregoing charging process.

TABLE 1

| Battery No. | Pre-charging conditions | | Setting voltage (V) | Current value 2 (mA/cm$^2$) | Charging time (h) | Open-circuit voltage of battery after 3 days from pre-charging (V) | Discharging capacity (mAH) | Capacity ratio after 300 cycles (%) |
|---|---|---|---|---|---|---|---|---|
| | Ageing time (at 25° C.) until pre-charging | Heat ageing conditions until pre-charging | | | | | | |
| 1 | 15 | — | 3.1 | 0.4 | 2 | 2.58 | 1,600 | 81 |
| 2 | 75 | — | 3.1 | 0.4 | 2 | 2.53 | 1,585 | 82 |
| 3 | 15 | 50° C./48h | 3.1 | 0.4 | 2 | 2.61 | 1,610 | 84 |
| 4 | 15 | — | 3.4 | 0.4 | 2 | 3.01 | 1,560 | 79 |
| 5 | 15 | — | 2.2 | 0.4 | 2 | 1.70 | 1,490 | 75 |
| 6 | 15 | — | 3.7 | 0.4 | 4 | 3.41 | 1,425 | 75 |
| 7 | 15 | — | 3.1 | 0.1 | 2 | 2.55 | 1,625 | 83 |
| 8 | 15 | — | 3.1 | 1.2 | 2 | 2.60 | 1,590 | 78 |
| 9 | 15 | — | 3.1 | 2.7 | 2 | 2.85 | 1,610 | 75 |
| 10 | 240 | — | 3.1 | 0.4 | 2 | 2.41 | 1,570 | 80 |
| 11 | 480 | — | 3.1 | 0.4 | 2 | 2.28 | 1,555 | 79 |
| 12 | 1 | — | 3.1 | 0.4 | 2 | 2.55 | 1,595 | 75 |
| a | — | — | — | — | — | 0.85 | 1,375 | 70 |
| b | 0.5 | — | 1.7 | 0.4 | 2 | 1.35 | 1,400 | 71 |
| c | 15 | — | 1.1 | 0.2 | 2 | 0.91 | 1,390 | 70 |
| d | 15 | — | 4.1 | 2.7 | 1 | 3.85 | 1,480 | 65 |

Example 2

The same procedure as in Example 1 was carried out until cramping. Thereafter, the battery was aged at 0° C. for 2 hours, aged at 25° C. for 15 hours, and then subjected to cycle test at 25° C. and a current density of 0.75 mA/cm$^2$ over a voltage range of 2.7 to 3.1 V, 50 times (constant voltage charging and constant voltage-current discharging were effected in combination). After 3 days from ageing, the battery showed an open-circuit voltage of 2.85 V (Battery No. 1).

The battery thus processed was then evaluated in the same manner as in Example 1. The results are shown in Table 2.

Similarly, Battery Nos. 2 to 12, a, b, c, and d were subjected to test under the conditions shown in Table 1. The results are set forth in Table 2.

The term "pre-charging" shown in Table 2 means the foregoing charging process.

Example 3

A battery was prepared in the same manner as in Example 1 except that $SnB_{0.2}P_{0.5}K_{0.1}Ge_{0.1}O_{2.7}S_{0.02}$ (average particle) diameter: 6.8 $\mu$m) was used as a negative electrode material. The battery thus prepared was then subjected to pre-charging. Thereafter, the battery was evaluated in the same manner as in Example 1. The results are shown in Table 3 (Battery No. 15).

Similarly, Battery Nos. 2 to 6, a, and b were subjected to test under the conditions shown in Table 3. The results are shown in Table 3.

TABLE 2

| Battery No. | Pre-charging conditions | | Charging voltage (V) | Discharging voltage (V) | Current value (mA/cm$^2$) | No. of cycles | Open-circuit voltage of battery after 3 days from pre-charging (V) | Discharging capacity (mAH) | Capacity ratio after 300 cycles (%) |
|---|---|---|---|---|---|---|---|---|---|
| | Ageing time (at 25° C.) until pre-charging | Heat ageing conditions until pre-charging | | | | | | | |
| 1 | 15 | — | 3.1 | 2.7 | 0.75 | 50 | 2.85 | 1,610 | 83 |
| 2 | 75 | — | 3.1 | 2.7 | 0.75 | 50 | 2.88 | 1,595 | 83 |
| 3 | 15 | 50° C./72h | 3.3 | 2.5 | 0.75 | 50 | 2.95 | 1,600 | 81 |
| 4 | 15 | — | 2.5 | 1.8 | 0.75 | 50 | 2.30 | 1,580 | 80 |
| 5 | 15 | — | 1.8 | 1.2 | 0.75 | 100 | 1.51 | 1,550 | 75 |
| 6 | 15 | — | 3.5 | 3.0 | 0.75 | 50 | 3.28 | 1,520 | 80 |
| 7 | 15 | — | 3.1 | 2.7 | 0.25 | 50 | 2.77 | 1,600 | 80 |
| 8 | 15 | — | 3.1 | 2.7 | 2.7 | 50 | 2.70 | 1,570 | 81 |
| 9 | 15 | — | 3.1 | 2.7 | 0.75 | 150 | 2.88 | 1,610 | 82 |
| 10 | 15 | — | 3.1 | 2.8 | 0.5 | 10 | 2.80 | 1,575 | 79 |
| 11 | 240 | — | 3.2 | 2.5 | 0.75 | 100 | 2.91 | 1,600 | 78 |
| 12 | 2 | 50° C./2h | 3.1 | 2.7 | 0.75 | 50 | 2.78 | 1.570 | 80 |
| a | 15 | — | 1.6 | 1.0 | 0.75 | 50 | 1.35 | 1,490 | 72 |
| b | 15 | — | 1.2 | 0.5 | 0.75 | 50 | 0.82 | 1,380 | 78 |
| c | 15 | — | 4.1 | 2.5 | 5.0 | 50 | 3.90 | 1,495 | 68 |
| d | 15 | — | 4.1 | 3.8 | 0.75 | 750 | 3.92 | 1,310 | 67 |

TABLE 3

| Battery No. | Ageing time (at 25° C.) until pre-charging | Setting voltage (V) | Current value (mA/cm²) | Time (h) | Open-circuit voltage of battery after 3 days from precharging (V) | Discharging capacity (mAH) | Capacity ratio after 300 cycles (%) |
|---|---|---|---|---|---|---|---|
| 1 | 15 | 3.1 | 0.3 | 2 | 2.52 | 1,620 | 83 |
| 2 | 15 | 2.5 | 0.3 | 2 | 2.12 | 1,600 | 79 |
| 3 | 3 | 3.4 | 1.1 | 1 | 3.19 | 1,585 | 79 |
| 4 | 240 | 3.1 | 0.2 | 5 | 2.68 | 1,605 | 82 |
| 5 | 15 | 2.0 | 0.4 | 2 | 1.67 | 1,590 | 79 |
| 6 | 10 | 3.8 | 0.5 | 3 | 3.52 | 1,570 | 78 |
| a | — | — | — | — | 0.72 | 1,350 | 72 |
| b | 15 | 1.5 | 0.4 | 2 | 1.10 | 1,430 | 73 |

Example 4

The same procedure as in Example 1 was carried out until caulking. The battery thus prepared was aged at 3° C. for 2 hours, aged at 25° C. for 15 hours, charged with a constant quantity of electricity at 25° C. under the conditions shown in Table 4, and then stored at 55° C. for 2 weeks. The battery which had been stored was then evaluated in properties in the same manner as in Example 1. The results are shown in Table 4.

TABLE 4

| Battery No. | Pre-charging conditions | | | Open-circuit voltage after 3 days (V) | Discharging capacity (mAH) | Capacity ratio after 300 cycles (%) |
|---|---|---|---|---|---|---|
| | Current value (mA) | Time (h) | Quantity of electricity (mAH) | | | |
| 1 | 400 | 0.25 | 100 | 2.70 | 1,615 | 76 |
| 2 | 400 | 0.5 | 200 | 3.05 | 1,610 | 82 |
| 3 | 400 | 1 | 400 | 3.25 | 1,610 | 81 |
| 4 | 400 | 2 | 600 | 3.55 | 1,600 | 83 |
| 5 | 200 | 0.5 | 100 | 2.75 | 1,585 | 82 |
| 6 | 200 | 1 | 200 | 3.02 | 1,625 | 77 |
| 7 | 200 | 2 | 400 | 3.30 | 1,610 | 77 |
| 8 | 200 | 4 | 600 | 3.61 | 1,585 | 80 |
| 9 | 400 | 5 | 2,000 | 3.95 | 1,800 | 72 |
| 10 | 400 | 0.1 | 40 | 2.40 | 1,550 | 73 |
| 11 | 100 | 10 | 1,000 | 3.75 | 1,585 | 74 |
| 12 | 100 | 2 | 200 | 3.0 | 1,610 | 82 |

As is apparent from the foregoing results, the batteries having an open-circuit voltage of from 2.5 to 3.8 V obtained by at least one charging or charging-discharging during ageing exhibit a large discharging capacity and excellent cycle characteristics as compared with those having an open-circuit voltage of less than 2.5 V and more than 3.8 V.

INDUSTRIAL APPLICABILITY

As mentioned above, the present invention can provide a nonaqueous secondary battery having a high charge-discharge capacity, good charge-discharge cycle characteristics and a high energy density.

What is claimed is:

1. A method for preparing a nonaqueous secondary battery comprising a positive electrode sheet having a layer comprising a lithium-containing metal oxide, a negative electrode sheet having a negative electrode material mixture layer comprising a negative electrode material laminated with a metallic material comprising at least 90% lithium, a nonaqueous electrolytic solution containing a lithium salt, and a separator, wherein said nonaqueous secondary battery is prepared by a process which comprises winding said positive electrode sheet, negative electrode sheet and separator; inserting the elements thus wound into a battery can; injecting said electrolytic solution into said battery can, sealing said battery can, ageing said battery at a low temperature, charging or discharging said battery, and then ageing said battery at a high temperature.

2. The method for preparing a nonaqueous secondary battery as in claim 1, wherein the temperature at which said low temperature ageing is effected is from 2° C. to 30° C.

3. The method for preparing a nonaqueous secondary battery as in claim 1, wherein said charging or discharging before said high temperature ageing causes the open-circuit voltage of said battery to be from 2.5 V to 3.8 V.

4. The method for preparing a nonaqueous secondary battery as in claim 1, wherein said charging or discharging before said high temperature ageing is effected within 60 days after sealing.

5. The method for preparing a nonaqueous secondary battery as in claim 1, wherein the temperature of said high temperature ageing is from 40° C. or more to 70° C. or less.

6. The method for preparing a nonaqueous secondary battery as in claim 1, wherein the duration of said high temperature ageing is from 1 hour to 40 days.

7. The method for preparing a nonaqueous secondary battery as in claim 1, wherein said charging process is a constant electrical quantity charging process and the electrical quantity used is from 40 mAH to 400 mAH.

8. The method for preparing a nonaqueous secondary battery as in claim 1, wherein said charge-discharge process involves a constant voltage charging process which terminates at a voltage of from 2.0 to 3.8 V and a constant current discharging process which terminates at a voltage of from 1.0 to 3.5 V and the number of charge-discharge cycles is from 1 to 500.

9. A nonaqueous secondary battery comprising a positive electrode sheet having a layer comprising a lithium-containing metal oxide, a negative electrode sheet having a negative electrode material mixture layer comprising a negative electrode material laminated with a metallic material comprising at least 90% lithium, a nonaqueous electrolytic solution containing a lithium salt, and a separator, wherein said nonaqueous secondary battery is prepared by a process which comprises winding said positive electrode sheet, negative electrode sheet and separator; inserting the elements thus wound into a battery can; injecting said electrolytic solution into said battery can, sealing said battery can, ageing said battery at a low temperature, charging or discharging said battery, and then ageing said battery at a high temperature.

10. The nonaqueous secondary battery as in claim 1, wherein said negative electrode sheet is one comprising a layer comprising an oxide or chalcogenide of a metallic or semi-metallic element and at least one auxiliary layer containing an electrically-conductive water-insoluble particle laminated with a metallic material comprising lithium.

11. The nonaqueous secondary battery as in claim 1, wherein said negative electrode is made of a composite oxide or chalcogenide containing tin.

12. The nonaqueous secondary battery as in claim 11, wherein said composite oxide or chalcogenide containing tin is a compound represented by formula (1):

$$SnM^1_aO_tS_u \qquad (1)$$

wherein $M^1$ represents two or more elements selected from the group consisting of Al, B, P, Si, Ge, elements belonging to the groups I to III in the periodic table, and halogen elements; a represents a number of from 0.2 to 2; t represents a number of from 1 to 6; and u represents a number of not more than 0.5.

13. The nonaqueous secondary battery as in claim 11, wherein said composite oxide or chalcogenide containing tin is a compound represented by formula (3):

$$SnM^3_cM^4_dO_tS_u \qquad (3)$$

wherein $M^3$ represents at least one element selected from the group consisting of Al, B, P, Si and Ge; $M^4$ represents at least one element selected from the group consisting of elements belonging to the groups I and III in the periodic table, and halogen elements; c represents a number of from 0.2 to 2; d represents a number of from 0.01 to 1; t represents a number of from 1 to 6; and u represents a number of no more than 0.5, with the proviso that c and d satisfy the relationship of $0.2<c+d<2$.

* * * * *